US011003348B2

(12) United States Patent
Saur et al.

(10) Patent No.: US 11,003,348 B2
(45) Date of Patent: May 11, 2021

(54) ARRANGEMENT FOR DETERMINING THE PUPIL CENTER

(71) Applicant: Carl Zeiss Vision International GmbH, Aalen (DE)

(72) Inventors: Konrad Saur, Aalen (DE); Alexander Wohlfahrt, Huettlingen (DE); Subhashini Mani, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 139 days.

(21) Appl. No.: 14/882,154

(22) Filed: Oct. 13, 2015

(65) Prior Publication Data

US 2017/0102853 A1    Apr. 13, 2017

(51) Int. Cl.
*G06F 3/0488*        (2013.01)
*G06F 3/0484*        (2013.01)

(52) U.S. Cl.
CPC ........ *G06F 3/0488* (2013.01); *G06F 3/04845* (2013.01)

(58) Field of Classification Search
CPC ..... G06F 3/048; G06F 3/0488; G06F 3/04845
See application file for complete search history.

(56) References Cited

U.S. PATENT DOCUMENTS

| 2009/0027349 A1* | 1/2009 | Comerford | G06F 1/1626 |
| | | | 345/173 |
| 2009/0135372 A1* | 5/2009 | Sarver | A61B 3/112 |
| | | | 351/212 |
| 2009/0247998 A1* | 10/2009 | Watanabe | A61F 9/008 |
| | | | 606/5 |
| 2011/0304819 A1* | 12/2011 | Juhasz | A61B 3/102 |
| | | | 351/206 |

(Continued)

FOREIGN PATENT DOCUMENTS

| DE | 202015007114 U1 | 10/2015 |
| WO | 0231581 A1 | 4/2002 |
| WO | 2008086218 A2 | 7/2008 |

OTHER PUBLICATIONS

English translation of the Office action of the Austrian Patent Office dated Jul. 27, 2016 in corresponding Austrian patent application 3 GM 50184/2015-1.

(Continued)

*Primary Examiner* — Jeanette J Parker
(74) *Attorney, Agent, or Firm* — Walter Ottesen, P.A.

(57) ABSTRACT

The invention is directed to an arrangement for determining the pupil center of an eye of a person in an image. The arrangement includes a touch-sensitive display device for displaying the image with the eye of the person and a gesture recognition unit for recognizing a first predetermined gesture in response to a touching of the touch-sensitive display device by a user. The gesture recognition unit is configured (Continued)

to recognize, as a first predetermined gesture, a movement of two fingers at a distance (D) to each other touching the touch-sensitive display and carrying out an orbital rotational movement about a common rotation center. A contrast changing unit changes the contrast of the image displayed on the touch-sensitive display device in response to the user touching the touch-sensitive display device in a manner recognized as the first predetermined gesture by the gesture recognition unit.

25 Claims, 5 Drawing Sheets

(56) References Cited

U.S. PATENT DOCUMENTS

| | | | | |
|---|---|---|---|---|
| 2012/0221950 | A1* | 8/2012 | Chao | G06F 3/04883 |
| | | | | 715/716 |
| 2013/0321402 | A1* | 12/2013 | Moore | G01C 21/3611 |
| | | | | 345/419 |
| 2014/0114297 | A1* | 4/2014 | Woodley | A61F 9/008 |
| | | | | 606/6 |
| 2014/0181737 | A1* | 6/2014 | Hwang | G06F 3/0488 |
| | | | | 715/800 |
| 2015/0012857 | A1* | 1/2015 | Tang | G06F 3/04886 |
| | | | | 715/768 |
| 2015/0095843 | A1* | 4/2015 | Greborio | G06F 3/0481 |
| | | | | 715/784 |
| 2016/0191819 | A1* | 6/2016 | Sakai | H04N 5/23245 |
| | | | | 348/333.12 |
| 2016/0283106 | A1* | 9/2016 | Thorne | G06F 3/04886 |

OTHER PUBLICATIONS

Zeiss Brochure, "i.TERMINAL^R 2—Quick Guide Software application for acquisition of the centration data for precision lenses.", EN_20_070_73001, pp. 1-10. http://www.zeiss.com/content/dam/Vision/Vision/International/Pdf/en/dti/EN_20_070_7300I_QG_i-Terminal-2_31-03-15.pdf.

"Touchscreen", https://de.wikipedia.org/wiki/Touchscreen, updated Sep. 26, 2016, downloaded Sep. 28. 2016, pp. 1-9.

"Die VoiceOverGesten", http://www.apfelschule.ch, dated Aug. 21, 2016, downloaded Sep. 28. 2016, pp. 1-8.

English translation of the Search Report of the Austrian Patent Office dated Nov. 16, 2016 with regard to corresponding Austrian application GM50184/2015.

* cited by examiner

ARRANGEMENT FOR DETERMINING THE PUPIL CENTER

FIELD OF THE INVENTION

The present invention relates to a device for determining the pupil center of an eye of a person in an image.

BACKGROUND OF THE INVENTION

In order to achieve the best possible visual performance of a spectacle wearer with his new spectacles, it requires more than only an exact determination of the correction lenses. In addition to establishing the required dioptric power and selecting a suitable spectacle lens type, it is important to center the spectacle lenses in the frame and in relation to the eyes in accordance with use.

Electronic spectacle lens centering has become the norm since the introduction of a video centering system by ZEISS in 1992. The precision and speed of measurement factors are decisive in the development of such systems.

An important parameter for correct spectacle lens centering lies in determining the location of the pupil center in relation to the frame. Under the product name i.Terminal, ZEISS offers a video centering unit by means of which the pupil center of a spectacle wearer can be determined. In particular, a camera is used to make a frontal record of the spectacle wearer and show it on a display of a computer. With the aid of the computer, it is possible, inter alia, to mark and register the location of the pupil center on the displayed image by way of a graphical user interface.

Any floor-mounted unit or else a mobile unit, such as a laptop or tablet, is suitable as a computer. The mobile device can comprise a touch-sensitive display apparatus, in particular a touchscreen, instead of a conventional keyboard.

According to the definition specified on https://de.wikipedia.org/wiki/Touchscreen (retrieved on 23 Sep. 2015), a touchscreen or touch-sensitive screen is "a combined input and output unit, by means of which the program flow of a technical unit, usually a computer, can be controlled directly by touching parts of an image. The technical implementation of the command entry is, as it were, invisible to the user and thus generates the impression of the direct control of a computer by pointing. The image which is made touch sensitive by the touchpad (situated thereon or therebelow) can be generated in various ways: dynamically by means of monitors, by projection or physically (for example, as a printout).

Instead of controlling a mouse pointer with the mouse or the like, it is possible to use the finger or a stylus. The display of a mouse pointer is therefore only still necessary if accurate and/or permanent positioning is desired (for example, in the case of graphical design) or if the image content needs to remain visible when selected (for example, if not enough display area is available).

The analogous operation to the mouse click is a short tap. By pulling the finger or stylus over the touchscreen, it is possible to carry out a "drag-and-drop" operation. Some systems can simultaneously process a plurality of touches into commands (Multi-Touch), for example to rotate or scale displayed elements. The term "Multi-Touch" is usually also used in the context of the capability of the system to identify gestures (for example, "swiping" to turn over a page).

Other systems permit the full emulation of a mouse pointer with an only display modus separate from tapping, for example, by the contactless identification of a finger hovering thereabove."

If a tablet with touchscreen is used in the above-described video centering unit, operations performed with the aid of a mouse pointer when using a floor-mounted unit as a computer, for example, positioning of circular or rectangular marking aids, "freezing" of images or marking of positions, are performed with the aid of finger contacts on the screen.

SUMMARY OF THE INVENTION

Although this type of operation is possible, in principle, and has also proven its worth, there is a need for an improvement when using a touchscreen for establishing centration data. In particular, there is a need for simplifying operations and increasing the precision when determining the pupil center.

This object is achieved by an arrangement for determining the pupil center of an eye of a person in an image. The arrangement includes: a touch-sensitive display device for displaying the image with the eye of the person; a gesture recognition unit for recognizing a first predetermined gesture in response to a touching of the touch-sensitive display device by a user; the gesture recognition unit being configured to recognize, as a first predetermined gesture, a movement of two fingers at a distance (D) to each other touching the touch-sensitive display and carrying out an orbital rotational movement about a common rotation center; and, a contrast changing unit for changing the contrast of the image displayed on the touch-sensitive display device in response to the user touching the touch-sensitive display device in a manner recognized as the first predetermined gesture by the gesture recognition unit.

The device according to the invention for determining the pupil center of an eye of a person in an image is based on the equipment and the options offered by a currently available tablet. The device (that is, for example, the tablet) comprises a touch-sensitive display apparatus for displaying the image with the eye of the person and a gesture recognition unit for identifying a first predetermined gesture, which occurs when the touch-sensitive display apparatus is touched by a user. The device furthermore comprises a contrast modification apparatus for modifying the contrast of the image displayed by the touch-sensitive display apparatus as a consequence of a touch by a user identified by the gesture recognition unit as first predetermined gesture.

According to the invention, the gesture recognition unit is configured to identify a movement of two fingers touching the touch-sensitive display apparatus at a distance from one another and performing an orbital rotary motion about a common center of rotation as first predetermined gesture. If the gesture recognition unit identifies such a movement of two fingers on the display apparatus, the contrast modification apparatus modifies the contrast of the image displayed on the display apparatus.

Compared to the prior art, the invention undertakes two changes. Firstly, it makes use of a rotary knob-like operability, which is reserved for mechanical rotary knobs according to the prior art, and, secondly, it allows a contrast to be modified while keeping the image display and without the additional necessity of superimposing an operating element, as is required for a mouse pointer-like operation even if use is made of a touchscreen. The problem addressed is completely solved by the subject matter according to the invention.

According to the prior art, clockwise rotary knob movements generally lead to an enlargement or increase in the intensity of the functionality controlled by the rotary knob, whereas anticlockwise rotary knob movements routinely lead to a reduction or decrease in the intensity of the functionality controlled by the rotary knob. In order also to provide this rotary movement direction actuation behavior known or familiar to the user in the device according to the invention, the invention provides for the contrast modification apparatus to be configured to increase the contrast when the orbital rotary movement is performed in a clockwise manner and/or for the contrast modification apparatus to be configured to reduce the contrast when the orbital rotary movement is performed in an anticlockwise manner. As a result of this measure, the user is not forced to adjust to an operating behavior that, in principle, is unknown.

For the purpose for which the device according to the invention is configured, namely for determining the pupil center of an eye of a person in an image, it was found to be advantageous if the rotary center is the center point of a first circle displayed on the display apparatus. The circle provides the user with an indication of the location at which he should touch the display apparatus with his fingers in order to realize the desired functionality, namely to increase or decrease the contrast of the displayed image. Preferably, after an increase, the contrast can be reduced back down to its initial value, but not to a lower value.

In principle, it is possible with the aid of the displayed circle merely to provide the user with an approximate indication for the surroundings in which he needs to carry out the finger movements in order to obtain the desired functionality. However, it was found that the user is used to a delineation of the sensitive region that is as precise as possible. According to the invention, the contrast modification apparatus is configured to modify the contrast of the displayed image as a consequence of the movement, only within the first circle, identified by the gesture recognition unit as first predetermined gesture.

In order to increase the precision when determining the pupil center, it is furthermore advantageous if a zoom function is implemented in the device. For identifying a second predetermined gesture, the gesture recognition unit can be configured, in order to realize this function, to identify as second predetermined gesture a movement of two fingers touching the touch-sensitive display apparatus at a distance from one another and in an arrangement opposite to one another in relation to the center point and performing a radial movement relative to the center point. An available magnification modification apparatus for modifying the size of the displayed image is preferably configured to modify the size of the displayed image as a consequence of a movement, only within the first circle, identified by the gesture recognition unit as second predetermined gesture. However, like zoom functions routinely realized on tablets, the zoom function according to the invention is spatially determined and restricted by the location of the displayed circle.

In the case of such a spatially determined and restricted zoom function, it is advantageous also to spatially restrict the location of the sensitivity in relation to gestures for triggering this zoom function. In this case, the magnification modification apparatus is configured to increase the size of the displayed image when the radial movement is carried out away from the center point and/or to reduce the size of the displayed image when the radial movement is carried out towards the center point.

It was found to be further advantageous if the gesture recognition unit is configured to identify a third predetermined gesture, namely to identify a movement of a finger touching a drawing point or handle on the first circle and moving away from the center point or towards the center point in the radial direction, and if the display apparatus is simultaneously configured to modify the size of the first displayed circle as a consequence of identifying the third predetermined gesture. As a consequence, there is an adaptation of the first circle and the locally defined functionality, provided by the circle in accordance with the description above, to the requirements of the user.

The touch-sensitive display apparatus can furthermore be configured to display within the displayed first circle a second circle, which is concentric with the center point, or a plurality of second circles, which are concentric with the center point. This second circle or these second circles can provide the user with indications about the location of the position of the pupil center in relation to the center point of the first circle (and of the second circles).

In one variant of the invention, provision is made for the size of the one second circle concentric with the center point or the size of the plurality of second circles concentric with the center point to remain unchanged as a consequence of identifying the second predetermined gesture and/or for the size of the one second circle concentric with the center point or the size of the plurality of second circles concentric with the center point to remain unchanged as a consequence of identifying the third predetermined gesture.

In another variant, provision is made for the size of the one second circle concentric with the center point or the size of the plurality of second circles concentric with the center point to be modified as a consequence of identifying the second predetermined gesture and/or for the size of the one second circle concentric with the center point or the size of the plurality of second circles concentric with the center point to be modified as a consequence of identifying the third predetermined gesture. It is advantageous to embody one of the second circles in the size of a pupil displayed on the display apparatus. Furthermore, alternatively or additionally, it is advantageous to embody another one of the second circles in the size of an iris displayed on the display apparatus.

In order to determine exactly the position of the pupil center of the person displayed on the display apparatus, it is advantageous if the display of a point or circle can be made to coincide with the displayed pupil and if this point or this circle or the center point of the circle can be marked and/or registered. Inter alia, the center point offers itself as marking or registration point. The functionality of the coincidence can be realized by the following embodiment of the device according to the invention.

The embodiment of the device includes the gesture recognition unit being configured to identify a fourth predetermined gesture, which is brought about when the user touches the touch-sensitive display apparatus. The gesture recognition unit is configured to identify as fourth predetermined gesture a movement of a finger touching the touch-sensitive display apparatus within the first circle and carrying out a movement, in particular a linear movement. The display apparatus is configured to displace the displayed first circle as a consequence of identifying the fourth predetermined gesture in accordance with the movement, in particular the linear movement, of the finger carrying out the fourth predetermined gesture.

Instead of, or in addition to, the gesture identification within the first circle, the gesture recognition unit can be configured to identify as fourth predetermined gesture a movement of a finger touching the touch-sensitive display apparatus at a drawing point on the first circle and carrying out a movement, in particular a linear movement.

A "freeze" functionality can serve as aid for marking and/or registration, which functionality "freezes" the current display on account of a user request. For this purpose, the gesture recognition unit of the device according to the invention can be configured to identify as fifth predetermined gesture tapping of a predetermined area on the display apparatus using a finger. At the same time, the display apparatus can be configured to set permanently at the displayed location and/or with the displayed size the displayed first circle and/or the displayed second circle concentric with the center point or the displayed plurality of second circles concentric with the center point as a consequence of identifying the fifth predetermined gesture.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
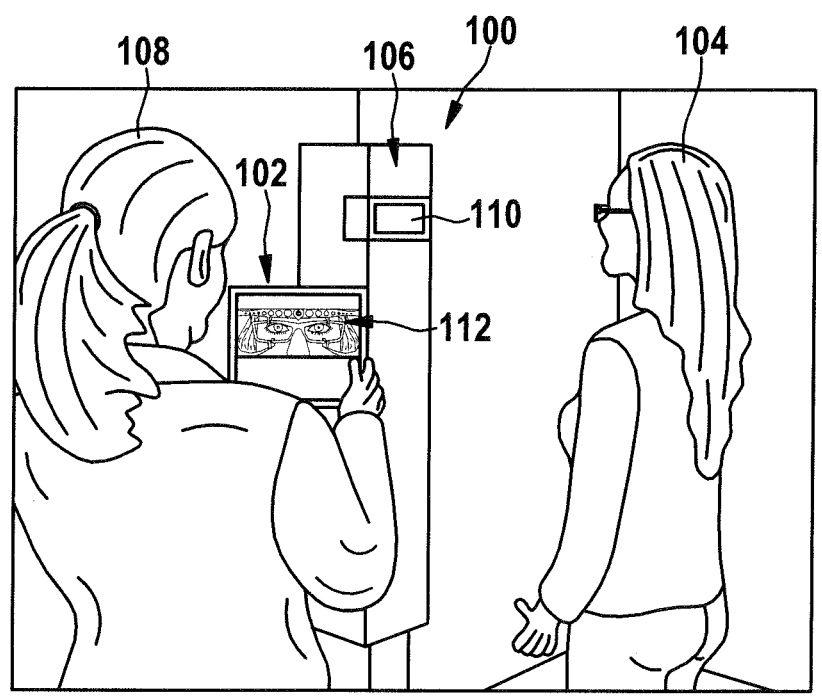
FIG. 1 shows a video centering system with a device according to the invention for determining the pupil center of an eye of a person in an image.

FIG. 1 shows a video centering system 100 with a device 102 according to the invention for determining the pupil center of an eye of a person 104 in an image. The video centering system 100 comprises a fixation and image recording apparatus 106 and the device 102 in the form of a tablet. By way of the tablet 102, an operator 108 controls the image recording of the eye area of the person 104 by means of a video camera 110 installed in the fixation and image recording apparatus 106.

FIGS. 2 to 8 show images of the eye area of the person 104 currently recorded by the video camera 110, as displayed on the display apparatus 112 (display) of the tablet 102, while determining the center point position using the video centering system according to FIG. 1.

Figure 2:
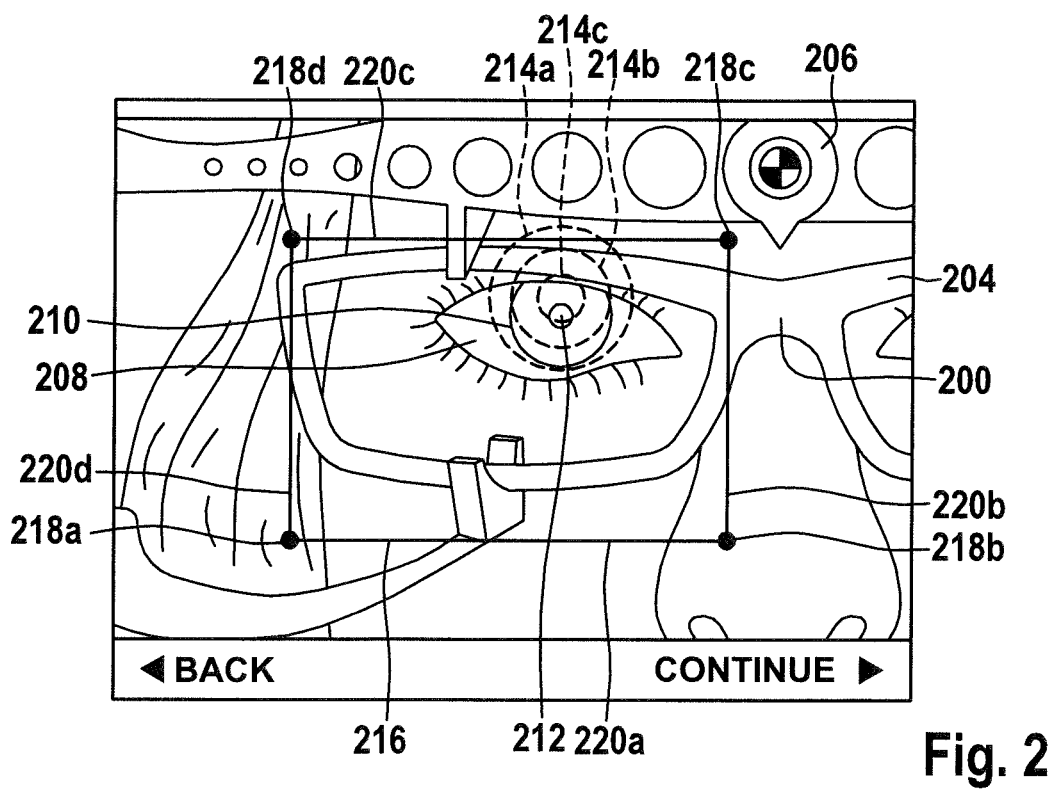
FIG. 2 shows a display on the display apparatus of a device according to the invention when setting an auxiliary frame for the spectacle frame while determining a centering point position using the video centering system according to FIG. 1.

FIG. 2 shows a display on the display apparatus 112 when setting an auxiliary frame 202 for the spectacle frame 204. What can be seen is the right eye area of the person 104. The person 104 wears spectacles 200 with a clearly visible frame 204, which surrounds the right eye 208 of the person 104. A calibration bracket 206 is fastened to the frame 204.

Figure 3:
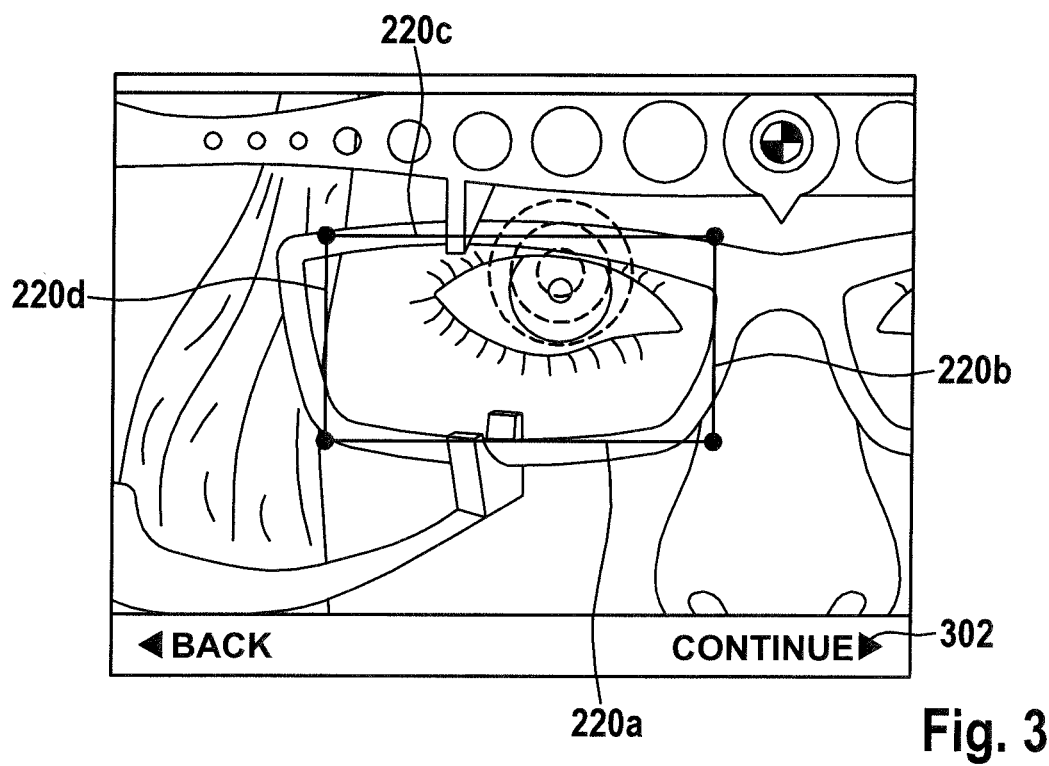
FIG. 3 shows a display on the display apparatus of the device according to the invention after setting an auxiliary frame for the spectacle frame while determining a centering point position using the video centering system according to FIG. 1.

Three concentrically arranged circles (214a, 214b, 214c) are visible in the region of the iris 210 and pupil 212 of the eye 208. Furthermore, what can be seen is a rectangular auxiliary frame 216, at the corners of which drawing points (218a, 218b, 218c, 218d) are arranged. The operator 108 can modify the size of the auxiliary frame 216 by touching one of the drawing points (218a, 218b, 218c, 218d) with a finger and moving the finger over the display apparatus 112. By way of the drawing points (218a, 218b, 218c, 218d), the operator 108 sets the auxiliary frame 216 for the spectacle frame 204 in such a way that all four side lines (220a, 220b, 220c, 220d) of the rectangular auxiliary frame 216 respectively rest against the inner edge of the spectacle frame 204, as shown in FIG. 3.

Figure 4:
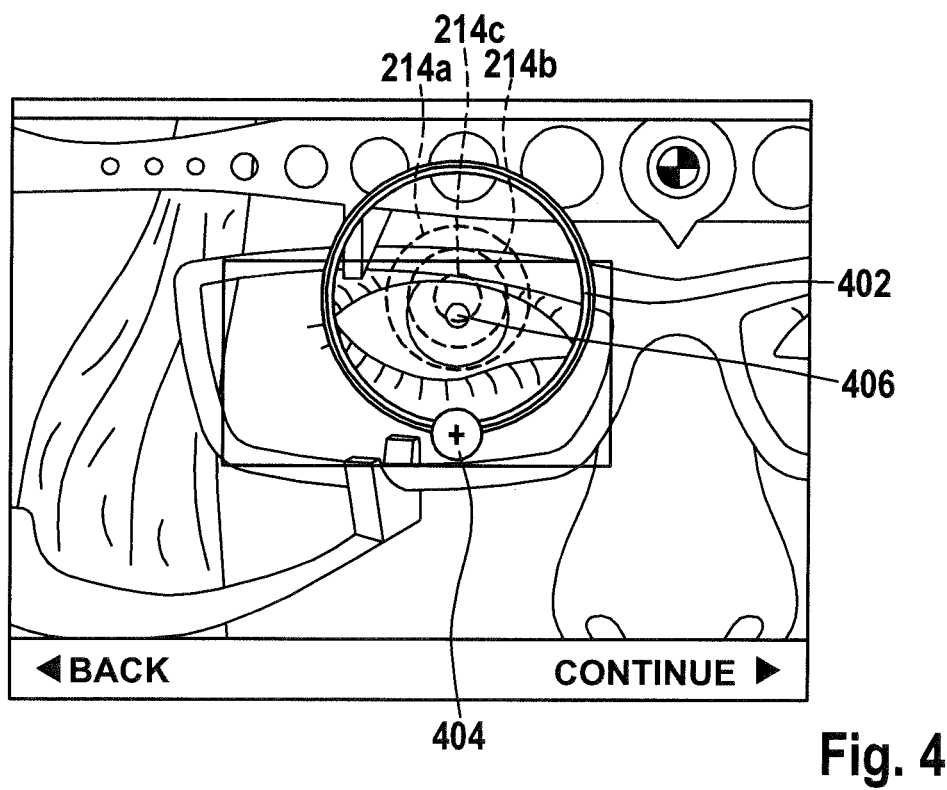
FIG. 4 shows a display on the display apparatus of a device according to the invention when setting a centering point position for the right eye of a spectacle wearer while determining a centering point position using the video centering system according to FIG. 1.
Figure 5:
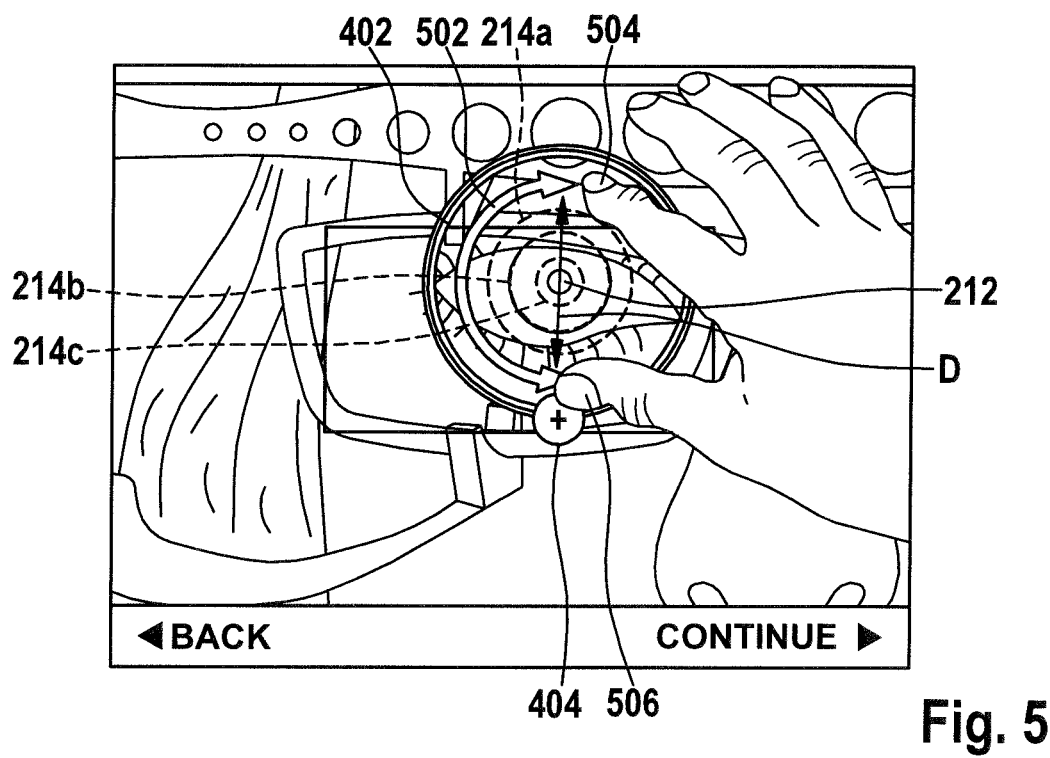
FIG. 5 shows a display on the display apparatus of the device according to the invention after setting a centering point position for the right eye of a spectacle wearer while determining a centering point position using the video centering system according to FIG. 1.
Figure 6:
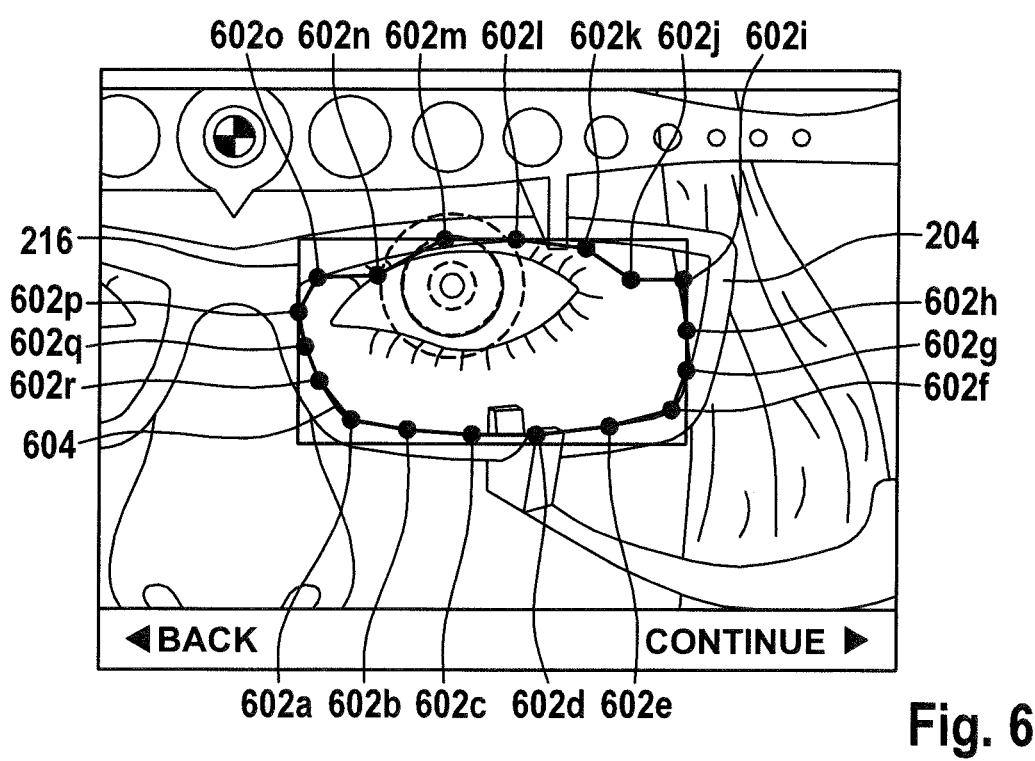
FIG. 6 shows a display on the display apparatus of a device according to the invention when registering a spectacle lens form while determining a centering point position using the video centering system according to FIG. 1; and, FIG. 7 shows a display on the display apparatus of a device according to the invention when registering a spectacle lens form while determining a centering point position using the video centering system according to FIG. 1; and, FIG. 8 shows a display on the display apparatus of the device after setting a centering point position for the right eye of a spectacle wearer while determining a centering point position using the video centering system according to FIG. 1.
Figure 7:
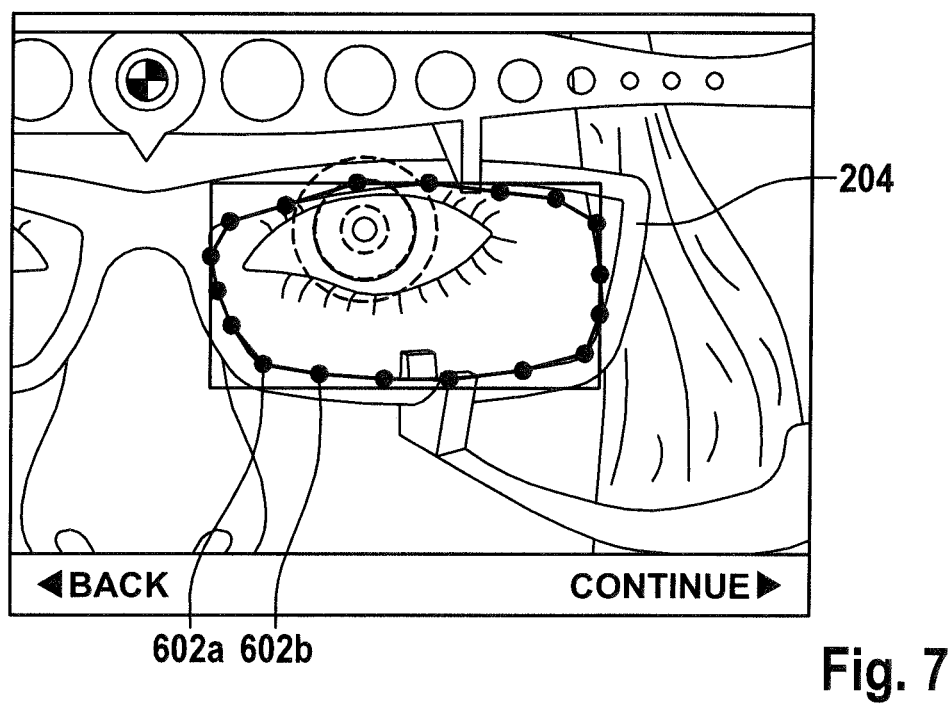
Figure 8:
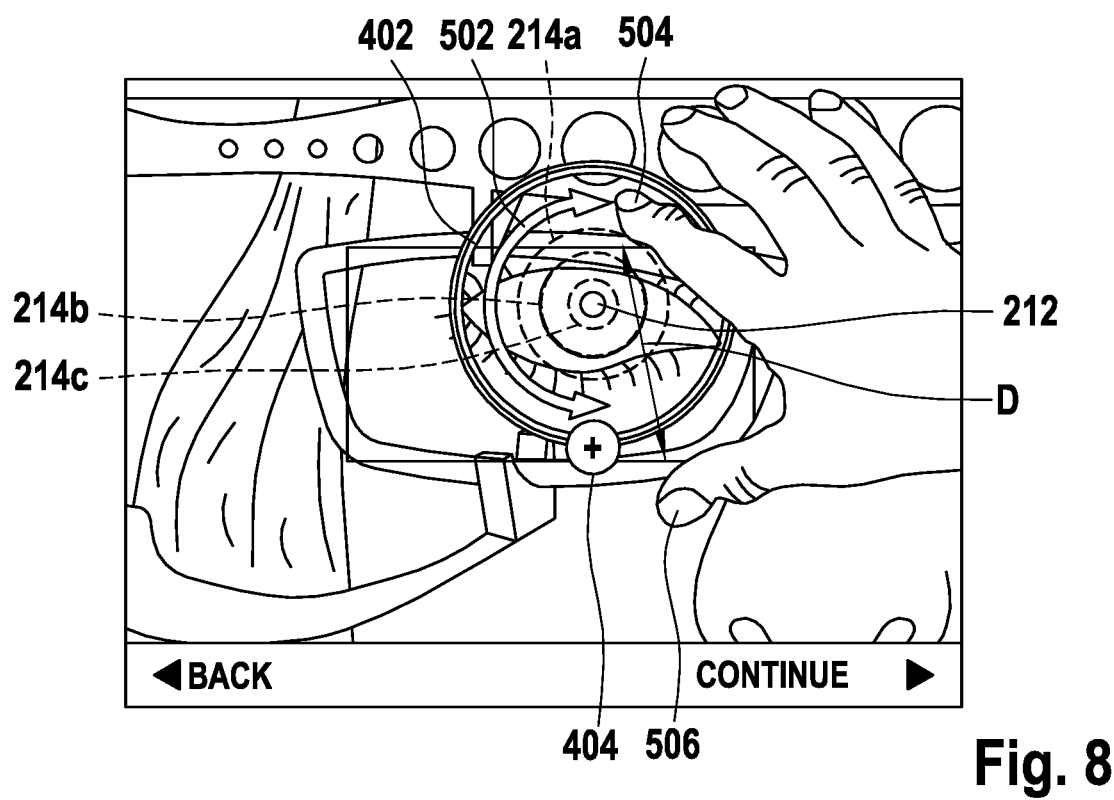

Then, the operator 108 uses his finger to tap onto the control panel "Continue" 302. A circle 402, which concentrically surrounds the circles (214a, 214b, 214c) (which are referred to as second circle in the general part of the description), appears, as shown in FIG. 4. A drawing point 404 is arranged on this circle 402 (which is referred to as first circle in the general part of the description). The directional arrows on the drawing point 404 indicate that, when the drawing point 404 is touched by a finger and when the finger touching the drawing point 404 is moved over the display apparatus, the circles (402, 214a, 214b, 214c) can be displaced over the fixed image of the person 104. With the aid of this functionality, the operator 108 displaces the measurement figure consisting of the concentric circles (402, 214a, 214b, 214c) in such a way that these lie concentric with the pupil center 406. For improved identification of the pupil 212, the operator 108 can make use of zoom and contrast functions. This is explained below on the basis of FIG. 5.

The gesture recognition unit of the tablet 102 is configured in such a way that, as a predetermined gesture, it identifies a movement of two fingers (504, 506) which touch the touch-sensitive display apparatus at a distance D from one another and carry out an orbital rotary movement 502 about a common center of rotation. The contrast modification apparatus of the tablet 102 modifies the contrast of the image displayed by the touch-sensitive display apparatus as a consequence of the touch by the operator 108 identified as predetermined gesture by the gesture recognition unit within (and optionally also outside of) the circle 402. By moving the fingers (504, 506) towards the outside in the radial direction, it is also possible to undertake a magnification of the displayed image within (and optionally also outside of) the circle 402.

Subsequently, the operator 108 undertakes the positioning of the auxiliary frame and the pupil center for the left eye of the person 104 in the same manner. Optionally, the operator 108 can register the spectacle lens form on the right-hand or left-hand side. To this end, the operator 108 taps onto "Frame form" in a text field. A plurality of drawing points (602a, 602b, . . . 602r) appear on the rectangular auxiliary frame 216 (shown for the left eye area in FIG. 6). With the aid of these drawing points (602*a*, 602*b*, . . . 602*r*), a form element 604 can be matched to the internal contour of the spectacle frame 204. Determining the spectacle lens form is advantageous when ordering thickness-optimized spectacle lenses.

It is understood that the foregoing description is that of the preferred embodiments of the invention and that various changes and modifications may be made thereto without departing from the spirit and scope of the invention as defined in the appended claims.

What is claimed is:

1. An ophthalmic system for determining the pupil center of an eye of a person in a single image thereof, the system comprising:
   a fixation and image recording device for providing said single image;
   a touch-sensitive display for receiving and displaying said single image with the eye of the person;
   a gesture recognition unit for recognizing a first predetermined gesture in response to a touching of said touch-sensitive display by a user;
   said touch-sensitive display displaying an operator-controlled element including at least one circle for marking a pupil center of the eye in the single image thereof;
   said operator-controlled element being configured to be superimposed on said single image with the eye of the person displayed on said touch-sensitive display;
   said at least one circle being configured to be displaced by an operator so as to cause said at least one circle to lie concentric with a pupil center of the eye in said single image with the eye of the person;
   said gesture recognition unit being configured to recognize, as a first predetermined gesture, a movement of two fingers at a distance (D) to each other touching said touch-sensitive display and carrying out an orbital rotational movement on said display about a common rotation center; and,
   a contrast changing unit for changing the contrast of said single image displayed on said touch-sensitive display while keeping said single image displayed in response to said movement of two fingers at the distance (D) to each other touching said touch-sensitive display being identified by said gesture recognition unit as said first predetermined gesture independent of said operator-controlled element while making no provision of an operator-controlled contrast changing element or display of an operator-controlled contrast changing element on said display, wherein said contrast changing unit is configured to change the contrast of said single image exclusively within said at least one circle so as to aid the user in determining the pupil center of the eye.

2. The system of claim 1, wherein said contrast changing unit is configured to increase contrast when said orbital rotational movement is carried out in a clockwise direction.

3. The system of claim 1, wherein said contrast changing unit is configured to decrease contrast when said orbital rotational movement is carried out in a counterclockwise direction.

4. The system of claim 1, wherein said contrast changing unit is configured to increase contrast when said orbital rotational movement is carried out in a clockwise direction; and, said contrast changing unit is configured to decrease contrast when said orbital rotational movement is carried out in a counterclockwise direction.

5. The system of claim 1, wherein said common rotation center is the mid point of a first circle displayed on said touch-sensitive display.

6. The system of claim 5, wherein said movement is recognized as said first predetermined gesture by said gesture recognition unit.

7. The system of claim 5 further comprising:
   a magnification changing unit for changing the size of the displayed single image;
   said gesture recognition unit being configured to recognize a second predetermined gesture, which takes place and is set up by touching said touch-sensitive display by a user, and configured to recognize, as said second predetermined gesture, a movement of two fingers at a distance (D) to each other touching said touch-sensitive display and carrying out a radial movement relative to said mid point; and
   said magnification changing unit being configured to change the size of the displayed single image as a consequence of a movement exclusively within said first circle, said movement being recognized by said gesture recognition unit as said second predetermined gesture.

8. The system of claim 7, wherein said magnification changing unit is configured to magnify the size of the displayed single image when said radial movement is carried out from said mid point.

9. The system of claim 7, wherein said magnification changing unit is configured to demagnify the size of the displayed single image when said radial movement is carried out from said mid point.

10. The system of claim 7, wherein said magnification changing unit is configured to magnify the size of the displayed single image when said radial movement is carried out from said mid point; and, said magnification changing unit is configured to demagnify the size of the displayed single image when said radial movement is carried out from said mid point.

11. The system of claim 7, wherein said touch-sensitive display is configured to display, within the displayed first circle, a second circle concentric to said mid point or several second circles concentric to said mid point.

12. The system of claim 11, wherein the size of the one second circle concentric to said mid point or the size of the several second circles concentric to the mid point do not change as a result of the recognition of said second predetermined gesture.

13. The system of claim 11, wherein:
   said gesture recognition unit is configured to recognize a third predetermined gesture which results by touching said touch-sensitive display by the user; and
   the size of the second circle concentric to said mid point or the size of the several second circles concentric to said mid point do not change as a result of the recognition of said third predetermined gesture.

14. The system of claim 11, wherein: said gesture recognition unit is configured to recognize a third predetermined gesture which results by touching said touch-sensitive display by the user; the size of the one second circle concentric to said mid point or the size of the several second circles concentric to the mid point do not change as a result of the recognition of said second predetermined gesture; and, the size of the second circle concentric to said mid point or the size of the several second circles concentric to said mid point do not change as a result of the recognition of said third predetermined gesture.

15. The system of claim 11, wherein the size of the one second circle concentric to said mid point or the size of the several second circles concentric to said mid point change as a result of the recognition of the second predetermined gesture.

16. The system of claim 11, wherein:
said gesture recognition unit is configured to recognize a third predetermined gesture which results by touching said touch-sensitive display by the user; and
the size of the one second circle concentric to said mid point or the size of the several second circles concentric to said mid point changes as a result of the recognition of said third predetermined gesture.

17. The system of claim 11, wherein: said gesture recognition unit is configured to recognize a third predetermined gesture which results by touching said touch-sensitive display by the user; the size of the one second circle concentric to said mid point or the size of the several second circles concentric to said mid point change as a result of the recognition of the second predetermined gesture; and, the size of the one second circle concentric to said mid point or the size of the several second circles concentric to said mid point changes as a result of the recognition of said third predetermined gesture.

18. The system of claim 11, wherein:
said gesture recognition unit is configured to recognize a fourth predetermined gesture which results when the touch-sensitive display is touched by the user;
said gesture recognition unit is configured to recognize, as a fourth predetermined gesture, a movement of a finger touching said touch-sensitive display within said first circle carrying out a movement including a linear movement and/or said gesture recognition unit is configured to recognize, as a fourth predetermined gesture, a movement of a finger touching said touch-sensitive display on a drawing point on said first circle carrying out a movement including a linear movement; and
said display is configured to displace the displayed first circle as a consequence of a recognition of said fourth predetermined gesture corresponding to the movement including a linear movement of the finger carrying out said fourth predetermined gesture.

19. The system of claim 18, wherein:
said gesture recognition unit is configured to recognize a fifth predetermined gesture which takes place when the touch-sensitive display is touched by the user;
said gesture recognition unit is configured to recognize, as a fifth predetermined gesture, a tapping with a finger of a predetermined area of said display; and
said display is configured as a result of a recognition of said fifth predetermined gesture to unchangeably fix at the displayed location and/or in the displayed size:
the displayed first circle and/or the displayed second circle concentric to said mid point; or,
the displayed several second circles concentric to said mid point.

20. The system of claim 5, wherein said gesture recognition unit is configured to recognize a third predetermined gesture which results by touching said touch-sensitive display by the user;
said display is configured to display a drawing point on said first circle;
said gesture recognition unit is configured, as said third predetermined gesture, to recognize a movement of a finger touching said drawing point to move in a radial direction away from said mid point or toward said mid point; and said display is configured to change the size of the displayed first circle as a consequence of a recognition of said third predetermined gesture.

21. The system of claim 1, wherein said at least one circle indicates whereat the operator is to perform said first predetermined gesture.

22. An ophthalmic system for determining the pupil center of an eye of a person in a single image thereof, the system comprising:
a non-transitory computer readable storage medium for receiving and storing said single image;
a touch-sensitive display for displaying said single image of the eye of the person stored on said computer readable storage medium;
a gesture recognition unit including program code stored on a non-transitory computer readable storage medium and configured to, when executed by a processor, recognize a first predetermined gesture in response to a touching of said touch-sensitive display by a user;
said touch-sensitive display displaying an operator-controlled element including at least one circle for marking a pupil center of the eye in the single image thereof;
said operator-controlled element being configured to be superimposed on said single image with the eye of the person displayed on said touch-sensitive display;
said at least one circle being configured to be displaced by an operator so as to cause said at least one circle to lie concentric with a pupil center of the eye in said single image with the eye of the person;
said gesture recognition unit being configured to recognize, as a first predetermined gesture, a movement of two fingers at a distance (D) to each other touching said touch-sensitive display and carrying out an orbital rotational movement on said display about a common rotation center; and
a contrast changing unit including program code stored on a non-transitory computer readable storage medium and configured to, when executed by a processor, change the contrast of said single image displayed on said touch-sensitive display while keeping said single image displayed in response to said movement of two fingers at the distance (D) to each other touching said touch-sensitive display being identified by said gesture recognition unit as said first predetermined gesture independent of said operator-controlled element while making no provision of an operator-controlled contrast changing element or display of an operator-controlled contrast changing element on said display, wherein said contrast changing unit is configured to change the contrast of said single image exclusively within said at least one circle so as to aid the user in determining the pupil center of the eye.

23. An ophthalmic system for determining the pupil center of an eye of a person in an image thereof, the system comprising:
a fixation and image recording device for providing said image;
a touch-sensitive display for receiving and displaying said image with the eye of the person;
a gesture recognition unit for recognizing a first predetermined gesture in response to a touching of said touch-sensitive display by a user;
said touch-sensitive display displaying an operator-controlled element including at least one circle for marking a pupil center of the eye in the image thereof;

said operator-controlled element being configured to be superimposed on said image with the eye of the person displayed on said touch-sensitive display;

said at least one circle being configured to be displaced by an operator so as to cause said at least one circle to lie concentric with a pupil center of the eye in said image with the eye of the person;

said gesture recognition unit being configured to recognize, as a first predetermined gesture, a movement of two fingers at a distance (D) to each other touching said touch-sensitive display and carrying out an orbital rotational movement on said display about a common rotation center; and, a contrast changing unit for changing the contrast of said image displayed on said touch-sensitive display while keeping said image displayed in response to said movement of two fingers at the distance (D) to each other touching said touch-sensitive display being identified by said gesture recognition unit as said first predetermined gesture independent of said operator-controlled element while making no provision of an operator-controlled contrast changing element or display of an operator-controlled contrast changing element on said display, wherein said contrast changing unit is configured to change the contrast of said image exclusively within said at least one circle so as to aid the user in determining the pupil center of the eye.

24. A method for determining a pupil center of an eye of a person in an ophthalmic system therefor, the method comprising:

providing a single image of the eye with a fixation and size recording device;

displaying the single image of the eye on a touch-sensitive display;

superimposing an operator-controlled element including at least one circle onto the image of the eye displayed on the touch-sensitive display, wherein the operator controlled element is configured to be displaced by an operator so as to cause the at least one circle to lie concentric to the pupil center of the eye;

recognizing a first predetermined gesture via a gesture recognition unit, wherein the first predetermined gesture includes a movement of two fingers at a distance to each other touching the touch-sensitive display carrying out an orbital rotational movement on the display about a common rotation center; and, adjusting a contrast of the single image displayed on the touch-sensitive display while keeping the single image displayed in response to said recognizing the first predetermined gesture including the movement of two fingers at a distance to each other so as to facilitate a determination by the operator of the pupil center of the eye, wherein the contrast is adjusted exclusively within the at least one circle.

25. The method of claim 24 further comprising:

visually determining the pupil center of the eye in the image at least partially via said adjusting the contrast of the image; and, displacing the operator controlled element so as to cause the at least one circle to lie concentric to the pupil center of the eye.

* * * * *